UNITED STATES PATENT OFFICE.

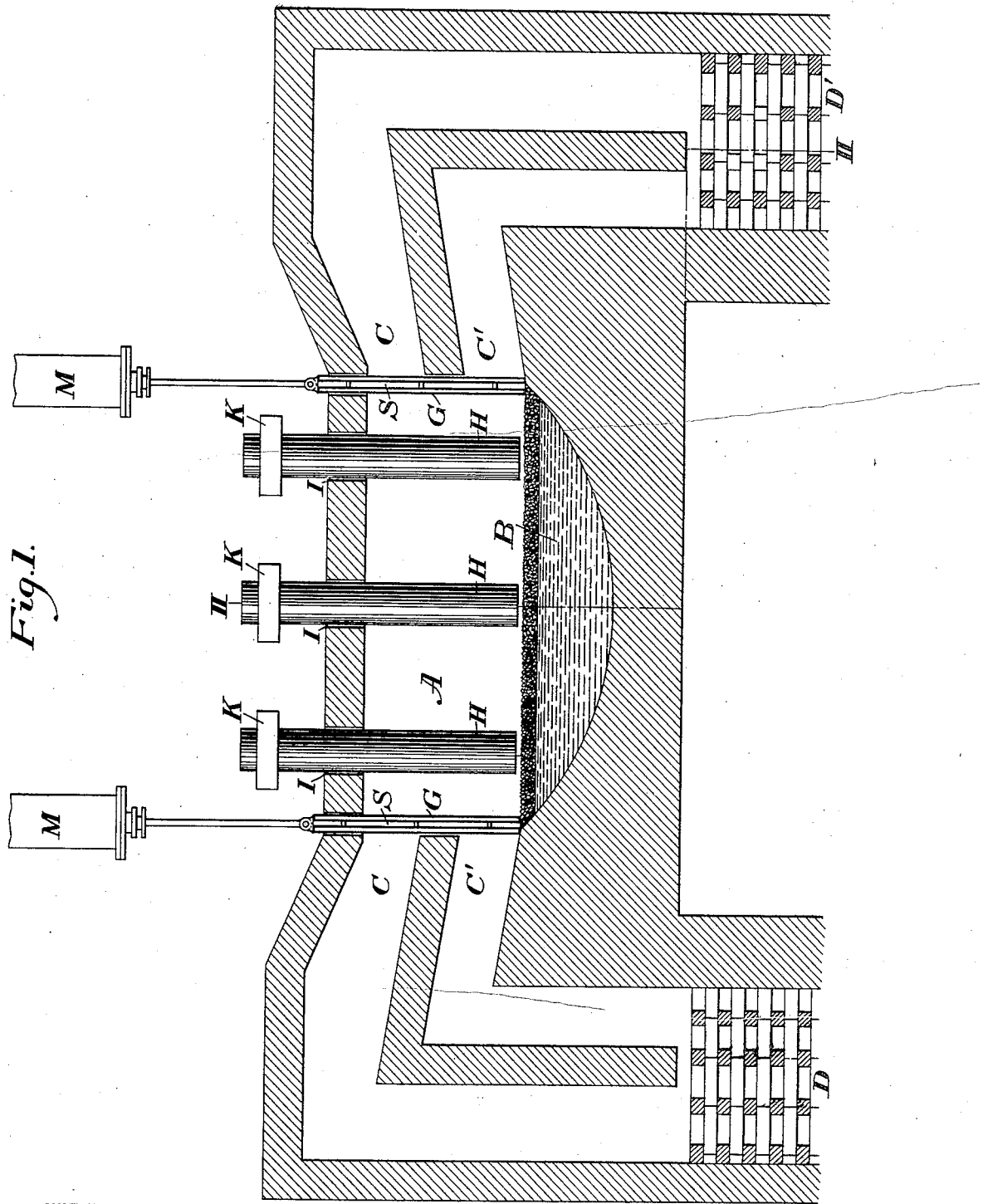

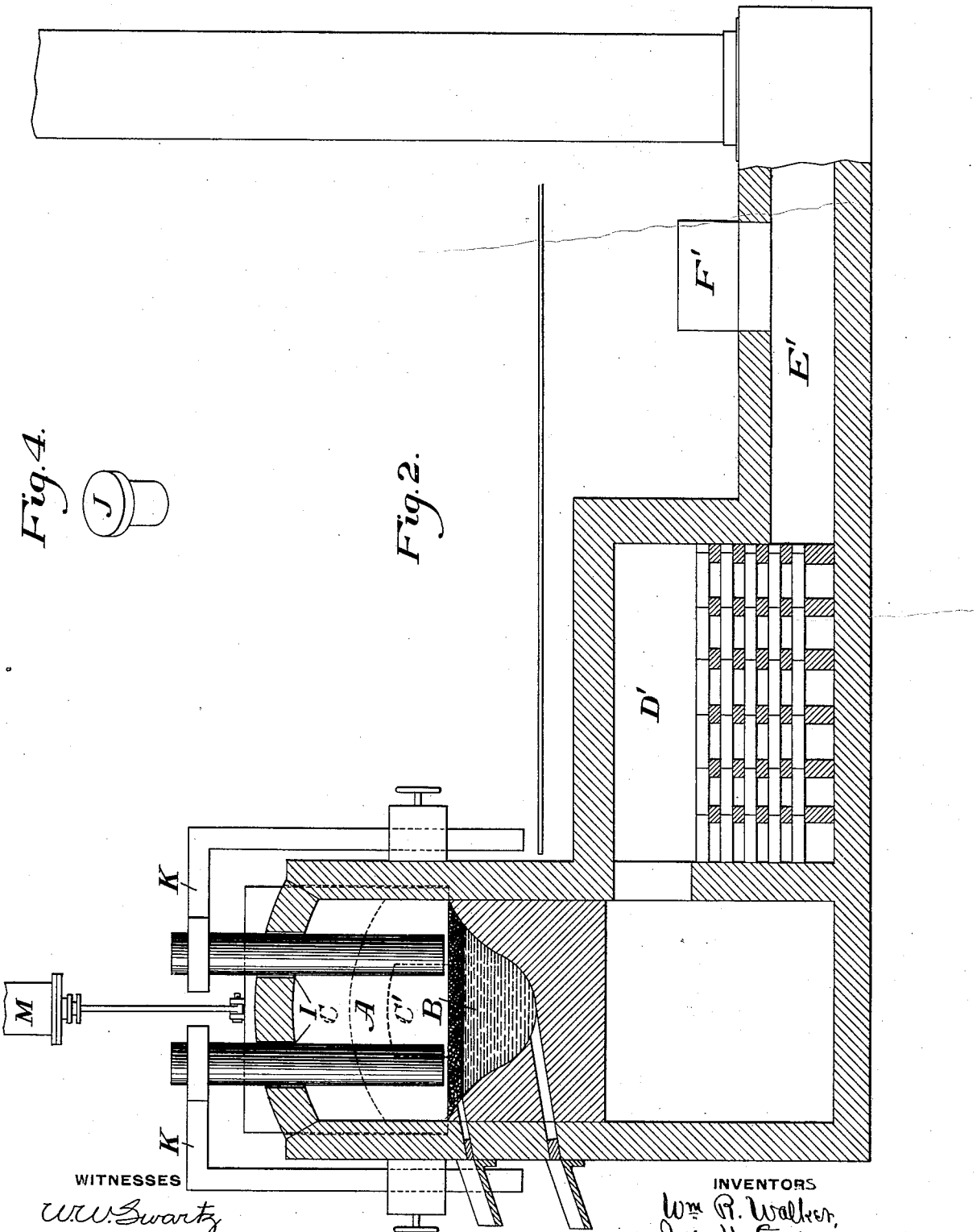

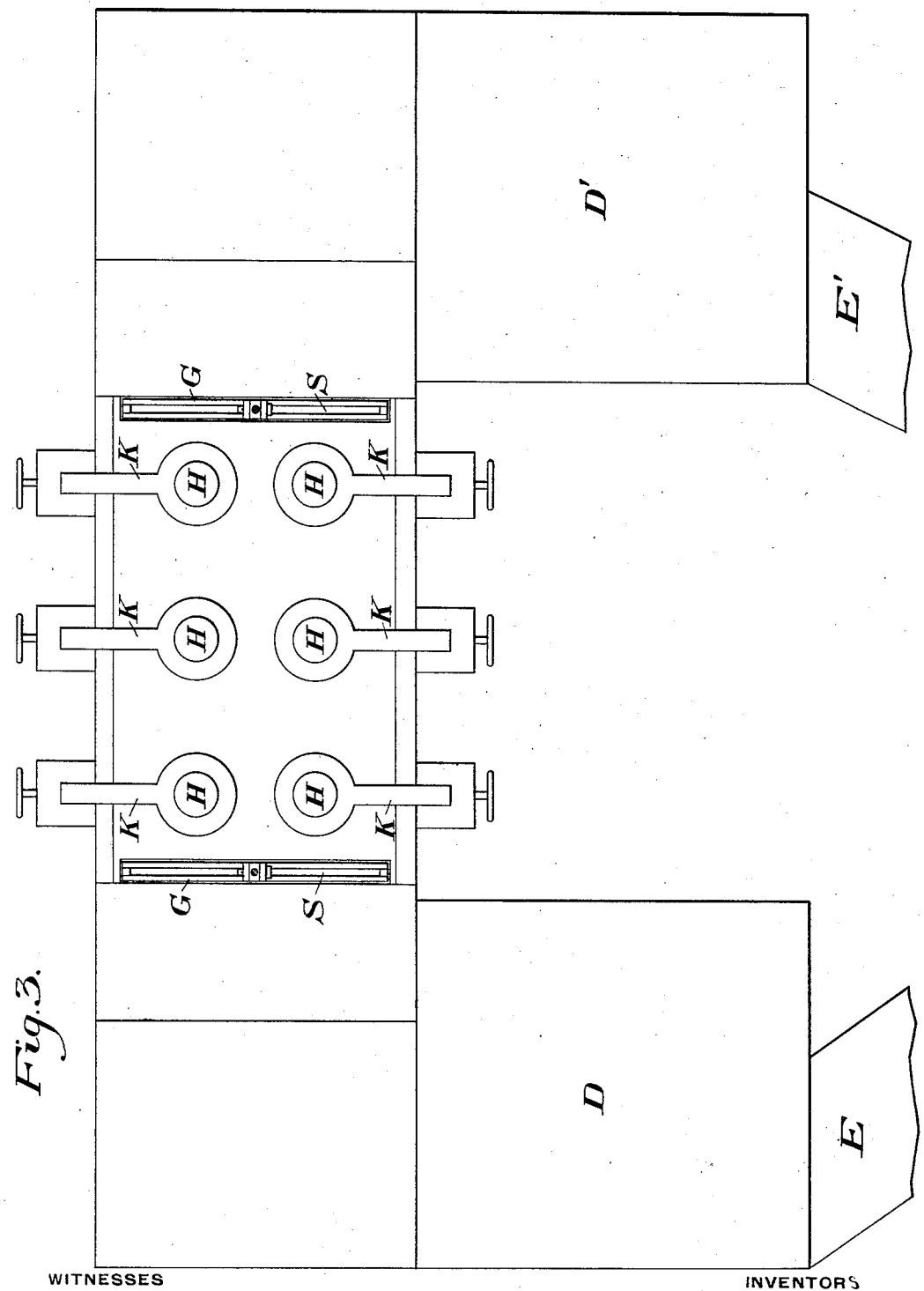

WILLIAM R. WALKER AND JAMES H. GRAY, OF NEW YORK, N. Y.

MANUFACTURE OF STEEL.

1,000,217.  Specification of Letters Patent.  Patented Aug. 8, 1911.

Application filed September 19, 1908. Serial No. 453,749.

*To all whom it may concern:*

Be it known that we, WILLIAM R. WALKER and JAMES H. GRAY, of the city of New York, county and State of New York, have invented a new and useful Improvement in the Manufacture of Steel, of which the following is a full, clear, and exact description, reference being had to the accompanying drawings, forming part of this specification.

This invention relates to the process of manufacturing steel by the elimination of carbon, phosphorus, silicon, etc., from pig iron, or a mixture of pig iron and steel scrap, under an oxidized slag in a flame-heated open hearth furnace; removing the slag, and subsequently further refining this steel in the same furnace by adding a new basic slag; shutting off the flame from the furnace; heating the bath with the high temperature of an electric arc and eliminating sulfur from the steel by means of the lime of the slag in connection with the intense electrical heat, and eliminating oxygen from the steel by causing it to combine with the calcium carbid formed in the bath of slag.

In the basic open hearth process as it is at present carried out, an oxidizing basic slag is used for the purpose of oxidizing the carbon, silicon and phosphorus in an oxidizing atmosphere, while the elimination of sulfur is not practicable by this process. When this refining process is completed, the steel is tapped from the furnace and the slag follows the steel into the ladle in which the steel is carried away from the furnace; and in some cases, especially where the pig iron has been charged molten into the furnace, the slag is preliminarily removed at an early stage of the heat.

In carrying out our invention, we remove silicon, carbon and phosphorus by the ordinary basic open hearth process, in a furnace to be described; and when the phosphorus and silicon have been nearly eliminated and the carbon largely reduced, we remove the overlying slag, part of the slag having been previously removed, if desired, then furnish a new basic slag and introduce electrodes by which we proceed with the further refining as conducted in the electric furnace. In this second part of the operation in the intense heat of the electric arc, and in a non-oxidizing atmosphere, calcium carbid is formed, whereby oxygen is withdrawn from the steel, and the lime of the basic slag at this temperature removes sulfur; at the same time, any iron or manganese or other metals existing in the slag in the shape of oxids, are reduced and thrown down as metal into the bath.

The second stage of the process in the electric furnace as just described, yields a steel equal to crucible steel, and greatly superior to open hearth steel, because of the elimination of oxygen and sulfur.

For the purpose of our invention, we have invented certain modifications and additions to the usual open hearth furnace and these are shown in the accompanying drawings, in which—

Figure 1 is a vertical longitudinal section of a furnace in which our invention can be carried out; Fig. 2 is a cross section on the lines II—II of Fig. 1; Fig. 3 is a top plan view, showing the arrangement of the electrodes; and Fig. 4 is a perspective view of one of the closing plugs or covers.

In the drawings, A is the melting chamber; B the bath in said chamber; C, C' are ports leading into the melting chamber; D, D' are regenerative chambers; E, E' are the flues leading to the chimney; F' are valves by which the regenerative chambers are caused to be traversed alternately by the gases. In the second stage of the process, while using this furnace as an electric furnace, the regenerative chambers should be cut off from the main heating chamber in order that the non-oxidizing gases in the melting chamber may not be drawn off through the regenerators, flues and stack, and that dust formed in the melting chamber, such as lime dust, which is destructive to certain kinds of brick work, may not pass into the regenerative chambers and flues; that explosive gases may not pass into the regenerators or flues, and that air may not be drawn in through the cracks about the doors. In order to cut off the melting chamber from the regenerative chambers, vertically sliding dampers G, G are closed after the refining of the bath with fuel is finished and before the refining with the electric arc is begun. These dampers are opened after the steel is finished and before the next charge is introduced into the furnace.

M, M are lifting cylinders or other lifting mechanism for opening and closing the dampers.

H, H are electrodes of which we show six, three of them being connected with the positive pole of the generator and the others with the negative pole, or they may be otherwise arranged in circuit so that the current shall enter and leave the furnace by way of the electrodes. Any suitable number of electrodes may be used and they may be introduced either vertically or horizontally. They are suspended from suitable supports and operated by suitable lifting mechanism, by which they can be introduced into the furnace through holes in the roof, the furnace operating as an electric furnace, during which time the raising and lowering mechanism keeps the electrodes at the proper distance from the metal in the bath, to give the required electric arc; or the electrodes may be withdrawn from the furnace during the period when the furnace is being operated with gas.

I are holes in the furnace-roof through which the electrodes are introduced, and these holes are closed with covers J (Fig. 4) when the electrodes are withdrawn, but it is possible to have these holes closed during the operation of the furnace with gas, by leaving the electrodes with their lower ends flush with the inside of the roof.

K, K are supports for the electrodes.

The following is given as an example of the way in which the heat of steel is worked from a charge of pig iron and scrap in our combination process, the materials being suitably varied when a charge of pig and ore without scrap is to be worked. The electrodes are withdrawn from the furnace, or raised to such a height that they merely close the holes in the roof, and the dampers G, G are opened. About three tons of lime stone and about two tons of iron ore are put on the bottom of the hearth. Then twenty-five tons of steel scrap are put into the furnace, covering the lime stone and ore. This material is heated by the oxidizing flame caused by the combustion of coal gas, natural gas, liquid or other fuels. Twenty-five tons of pig iron containing, say 3.85% of carbon, 3% phosphorus, .07% sulfur, 1% manganese, and 1% silicon, are then placed in the furnace. The lime and ore, with various impurities, form a slag. The oxygen contained in the slag, aided by the oxidizing action of the flame, in from eight to ten hours, burns out the carbon, silicon and phosphorus to the degree called for by the specifications for ordinary open hearth steel, reducing these components of the charge, say to carbon .2%; phosphorus, .025%; silicon .001%; sulfur, .04%; manganese, .01%. The slag is then removed, the flame is cut off, and the dampers, G, G, are closed. About two tons of burnt lime are then placed on the molten steel, say about 800 pounds of sand to form a slag with the lime, and about 100 pounds of pulverized carbon are thrown on the lime. The electrodes are then brought into operative position so that the current will flow in an arc from one electrode or electrodes to the metal, and thence out through the other electrode or electrodes; the electric current is passed through the electrodes and in about one-half hour the elimination of oxygen and the elimination of sulfur to a very small quantity, is complete, and the steel is at a proper temperature for tapping. The addition of any customary alloys is made in the furnace and the heat of steel is tapped into a ladle, from which it is passed into ingot molds.

In a companion application, Serial No. 453,748, filed September 19, 1908, we claim the apparatus above described.

Having described our process, the steps of which may be varied, we claim:

The method herein described, consisting in subjecting the charge of an open-hearth furnace to the oxidizing action of flame and gases to remove the carbon, silicon and phosphorus, removing the slag near the end of the heat, supplying a fresh basic slag to the charge in the same furnace, excluding the flame and gases from the furnace, and applying electric heat to the charge in a non-oxidizing atmosphere to deoxidize and desulfurize the metal of the bath.

In testimony whereof, we have hereunto set our hands.

WILLIAM R. WALKER.
JAMES H. GRAY.

Witnesses:
H. CLAY REIMER, Jr.,
ANNA E. WALLACE.